United States Patent Office 3,758,293
Patented Sept. 11, 1973

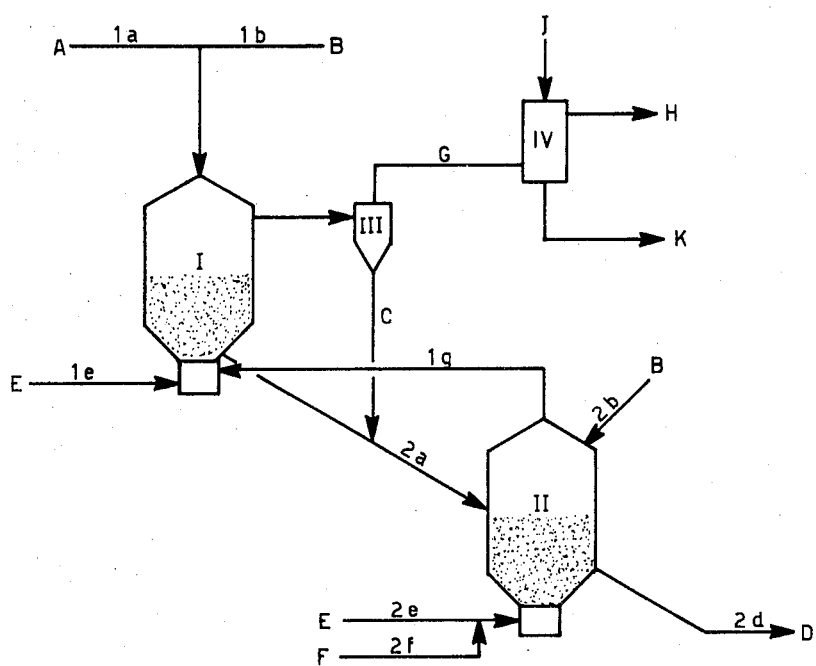

3,758,293
PROCESS FOR PURIFYING PYRITE ASHES OF NON-FERROUS METALS, ARSENIC AND SULFUR
Bruno Viviani, Giuseppe Sironi, and Ariano Colombini, Novara, Italy, assignors to Montecatini Edison S.p.A., Milan, Italy
Filed Dec. 4, 1970, Ser. No. 95,087
Claims priority, application Italy, Dec. 9, 1969, 25,507/69
Int. Cl. C21b 1/04
U.S. Cl. 75—23         7 Claims

ABSTRACT OF THE DISCLOSURE

A process for purifying pyrite or pyrrhotite ashes by removal therefrom non-ferrous metals, arsenic and sulfur. The process which comprises admixing pyrite with said pyrite ashes coming from a roasting furnace at 500°–800° C., said pyrite being in quantities of from 25–200 kg. of $FeS_2$ per ton of ash, depending on the temperature of the ashes. Treating the pyrite ash/pyrite admixture in a fluid bed at 850°–950° C. with a mixture of chlorine and oxygen containing gases in which the chlorine is equal to 105–120% of the stoichiometric with respect to the non-ferrous metals and to the arsenic present in the ashes and in the admixed pyrite. The oxygen is in such a quantity that the outflowing gases contain from 0.5 to 5% by volume $O_2$.

The present invention relates to a method for purifying pyrite and pyrrhotite ashes, more particularly it relates to a method for purifying said ashes by removing therefrom the non-ferrous metals, arsenic and sulfur.

As it is known, pyrite and pyrrhotite ashes, in order to be used in the metallurgical industry, must have a high content in iron and must be almost free of non ferrous metals such as Cu, Zn, Pb, As and from S. The maximum allowable limits for these impurities have been continuously dropping. At present, a fairly good commercial product should contain no more than 0.03–0.05% of Cu, Zn and Pb each and no more than 0.01–0.03% of As and S each (United States Steel—The Making, Shaping and Treating of Steel, 1957).

The non-ferrous metals are eliminated by transforming them into soluble chlorides or sulfates and by then removing the salts by acid lixivation, or by transforming the metals into chlorides with $Cl_2$, HCl, $CaCl_2$, etc., and by then removing them from the ashes by high temperature volatilization.

The elimination of the As is carried out during either the roasting of the pyrite or the various purification stages such as magnetizing reduction, chlorination, magnetic enrichment, lixivation, pelletizing under heat.

The removal of the S from the ashes is carried out, partly during the various just mentioned purification stages. In general, the ashes, at the end of such processes, have still a too high sulfur content, except for those ashes transformed into pellets hardened at temperatures above 1150° C.

U.S. Pat. No. 3,499,754 of Colombo et al., describes a process for the purification of pyrite ashes by removal therefrom non ferrous metals such as: Cu, Zn, Pb, Au, Ag, Ni, Co, Cd and Mn. This process follows sequence:

(a) Preheating at temperatures between 600° and 850° C. and partial or total reduction (20–100%) of the hematite to magnetite. This operation is carried out by injecting a carbonaceous fuel into the fluid-bed reactor together in a lesser quantity than that required for combustion;

(b) Chlorination and oxidation of the ashes reduced at temperatures between 650° and 950° C., in a fluid-bed reactor. The gaseous mixture, consisting of air and of 1–20% of chlorine, flows in counter-current with respect to the ashes. The quantity of chlorine used is the stoichiometric quantity required for the formation of the non ferrous chlorides, with an excess of from 5% to 20%;

(c) Scrubbing with water of the metal chloride vapors, thereby obtaining a solution from which the metals are recovered by conventional hydrometallurgical methods.

The ashes, purified of the non-ferrous metals but still containing sulfur, are directly conveyed to the pelletizing stage when their contents in iron is sufficiently high, otherwise they are first subjected to magnetic enrichment after a previous magnetizing reduction. The sulfur is volatized as $SO_2$ during the high temperature hardening of the pellets.

According to a variant of this process (United States patent application, Ser. No. 840,058, filed July 8, 1969), the reduction is carried out at higher temperatures, i.e. 850°–950° C. and with sufficiently long stay times, 30–90 min., to completely decompose the iron arsenate. The successive chlorination is carried out by maintaining a concentration of oxygen above 3% within the outflowing gases. In this way the arsenic still present after the chlorination stage will be in the form of soluble arsenate, removable by acid lixivation of the purified ashes. However, in this case also, the residual sulfur is completely removed, only during the high temperature pelletizing.

According to another variant of the process, United States patent application Ser. No. 844,600, filed July 24, 1969, now U.S. Pat. 3,649,245, the reduction is carried out in the presence of HCl and at temperatures of from 850° to 950° C. to obtain a high desulfuration and dearsenification. The subsequent chlorination is carried out by maintaining the lowest possible oxygen concentration within the outflowing gases so as to complete the removal of the residual S and As, together with the volatilization of the non ferrous metal chlorides. The final ashes, thus obtained, do not require any additional treatment except for enrichment in the case where the Fe content is still low, and they easily find a use in the iron industry.

A characteristic common to all three above described process is that the chlorination phase is always preceded by a partial reduction of the ashes from hematite to magnetite. The S initially contained by the ashes, is eliminated for the most part, with the outflowing gases.

We have now found, and this is among the objects of the invention, that the pyrite and pyrrhotite ashes may be freed from the non-ferrous metals, from arsenic and from sulfur without any previous not even partial, reduction to magnetite, when 200–25 kg. of pyrite per ton are added to said ashes, coming from the roasting furnace at a temperature of 500–800° C. The mixture is then treated at 850°–950° C. in a fluidized bed with a mixture of chlorine and oxygen containing gas, in which the chlorine is equal to 105—120% by volume of the stoichiometric with respect to the non-ferrous metals and to the arsenic present in the ashes and in the added pyrite, while the oxygen containing gas is in such a quantity that the outflowing gases will contain from 0.5 to 5% by volume of oxygen. Thanks to the addition of pyrite to the ashes, following the action of the combustion, the temperature in the fluidized bed is maintained at the desired values without resorting to outside heat sources.

The purification of the ashes can be carried out either in one single step or in two steps. Thus, one may for instance, permit the oxidation and the chlorination to occur in one single fluidized bed into which are simultaneously fed pyrite ashes, pyrite, and from below chlorine and air or any other oxygen containing gas. One may also feed into a first fluidized bed pyrite ashes, fresh pyrite and, from below, air and the gases coming from a second stage. Into the second stage is then fed the pyrite ash of the first stage, fresh pyrite and, from the bottom, air and chlorine.

It should be understood that the total quantities of pyrite air and chlorine must be equal to those hereinabove specified.

By carrying out the purification of the pyrite ashes according to this invention, it is possible to obtain:

ashes free of non-ferrous metals, of arsenic and sulfur;
solutions, slightly acid by hydrochloric and sulfuric acid, with a high non-ferrous metal content;
end gases with a high sulfur dioxide content.

The ashes purified according to this invention showed less than 0.03% content of each of Cu, Zn, Pb, S and As. These ashes, after an optional enrichment, if they are of a low content in iron, form an excellent raw material for the production of pellets, iron sponge or, in any way, for the preparation of materials with a high degree of metallization for the iron industry.

The solutions obtained according to this process have a high non ferrous metal content and are of low acidity and contain Fe and As, possibly Cu, in the form of lower valence. This turns out to be an economical advantage due to the reduced use of a neutralizing and cementing agent for the recovery of the copper.

Finally, the gases, after washing and subsequent separation of the metal chlorides and of the As compounds, of the fine powders dragged by the reactor of the $Cl_2$ and of a share part of $SO_2$, will contain, besides $N_2$ and $O_2$, $SO_2$ in a high quantity and may, thus, be effectively used in the production of sulfuric acid.

The two-stage process according to this invention may be carried out as follows: The purified pyrite ashes, coming from the pyrite roasting plant, are fed at a temperature between 500° and 800° C. into a first reactor for chlorination, operating at 850°–950° C. Also introduced into the reactor is pyrite at a rate of 25–200 kg. of $FeS_2$ per ton of ash. (200 kg. of pyrite serves to bring the ash from 500° up to 950° C., while 25 kg. raises the temperature from 800–850° C.). Air is introduced from below for the complete combustion of the pyrite (about 3 $Nm.^3$ of air per 1 kg. of pyrite, that is 75–600 $Nm.^3/t.$ of ash), together with the gas coming from the second chlorination reactor, containing the metal chlorides and the unreacted $Cl_2$. The gases flowing from the first reactor contain from 0.5 to 5% by volume of oxygen. In this first reactor, there takes place the partial purification of the ashes and the combustion of the pyrite with the development of heat which maintains the desired temperature and volatizes the chlorides that form from the reaction of the non-ferrous metals with the chlorine.

The ashes, partially purified in the first reactor, pass into a second reactor, also operating at from 850° to 950° C., wherein they meet $Cl_2$ (105–120% of the stoichiometric with respect to the non-ferrous metals and to the arsenic contained in the starting pyrite ashes and in the pyrites) at its maximum concentration, so as to further purify the ashes themselves in a satisfactory way.

The gases flowing out of the second reactor must contain only very small quantities of $O_2$ (less than 1%). In this way the ashes are also desulfurated and dearsenified. This is obtained by feeding air and pyrite to the second reactor, besides chlorine. Instead of air there may also be used a gas with a low oxygen content (for instance, part of the gas flowing out of the first reactor, after separation of the metal chlorides). The pyrite, or pyrrhotite or elementary sulfur, consumes the excess of undesirable oxygen, beside supplying the required heat.

The discharged ashes, purified from the non-ferrous metals from As and S, are then conveyed to the subsequent processing (magnetizing reduction, direct reduction, pelletizing under heat or cold). The gases pass through the first chlorinator through dust separators and finally are washed with water. The gases flowing out of the precipitation column, still contain most of the $SO_2$ coming from the combustion of the pyrite and are sent to the production of sulfuric acid.

When operating in one stage, one must operate with very low concentrations of $O_2$ (of less than 1%) in the out-flowing gases, in order to obtain dearsenified and desulfurated ashes. Whether one operates in two steps or just in one step, the quantity of added pyrite is obviously reduced, depending upon the quantity of unburnt sulfides still present in the ashes to be treated. The total residence time varies generally depending upon the impurity content and upon the temperatures adopted in the process and is, from 30 to 120 minutes.

The drawing schematically illustrates an embodiment of a two stage process.

The ashes A, discharged at an average temperature of 800° C. from a pyrite roasting plant, are fed into the fluid bed reactor I through 1a, while into the same reactor through 1b is also fed pyrite B. The latter may differ from the pyrite feeding the roasting plant, and is fed at a rate of 60–70 kg. of $FeS_2$ (calculated at 100%) per 1000 kg. of ashes. Air E is introduced into the bottom of the reactor, through 1e, in such quantities that the $O_2$ analyzer of the gases H flowing out of IV shows 3–5% by volume. This value is obtained with quantities of air between 150 and 300 $Nm.^3$ per one ton of ashes, against the 180–220 $Nm.^3$ that may be calculated theoretically for the $FeS_2$.

As a matter of fact, the use of air may be reduced depending upon the content of non-ferrous metal oxides, which by reacting with $Cl_2$, release $O_2$. In a contrary direction (the necessity of using greater quantities of air) are other parameters such as for instance, the content of ferrous iron and S as monosulfide and of sulfide in the starting ashes, as well as the diluent action exerted by the gas coming from the reactor II and which contains less than 1% of oxygen. To the bottom of the reactor I, is fed through 1g, the gas coming from reactor II and which contains unconverted $Cl_2$, $N_2$, $O_2$ (0.2–0.8% by volume), $SO_2$, $As_2O_3$ and $AsCl_3$, and the chlorides of the non-ferrous metals and of iron.

In reactor I, the total combustion of the pyrite B occurs, wherefore the temperature rises to about 900° C., as well as the partial conversion of the non ferrous metal oxides, contained in A, into chlorides. This is all at the expense of the $Cl_2$ and of the iron chlorides coming from reactor II. The fine powders, dragged along by the gases, are captured by cyclone III (dust separator) and admixed to the bed ashes, through 2a feed reactor II, operating at 900°–950° C. These ashes, besides the Fe and the gangue, contain the still unreacted non-ferrous metals, practically all the starting As and all the S bound as sulfate to the alkaline earth metals (CaO and BaO) present therein. The S as monosulfide and the pyritic S are practically absent.

Into the reactor II are then fed into the top for each ton of starting ashes A, an additional 40–48 kg. of pyrite B (calculated on 100% of $FeS_2$), while into the bottom, 100–200 $Nm.^3$ of air E and a quantity of chlorine F, equivalent to 105–120% of the stoichiometric with respect to the non-ferrous metals initially present in ashes A and B. The quantity of air and pyrite may also be lower than the above values when adjusted in such a way that an oxygen analyzer on the conduit of gas 1g will read 0.2–0.3% by volume when operating at 900° C., or 0.7–0.8% when operating at 950° C. This latter temperature may easily be attained thanks to the considerable heat supplied by the ashes and to the reaction heat between the pyrite and the air fed.

Besides the combustion of the pyrite, at this stage there also occurs the chlorination:

of the non-ferrous metals;

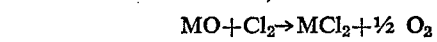
$$MO + Cl_2 \rightarrow MCl_2 + \tfrac{1}{2} O_2$$

of a small share part of the hematite;

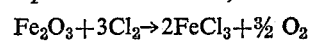
$$Fe_2O_3 + 3Cl_2 \rightarrow 2FeCl_3 + \tfrac{3}{2} O_2$$

of the pyrite;

$$FeS_2 + 2Cl \rightarrow FeCl_2 + 2SO_2$$

of the alkaline earty sulfates;

$$MSO_4 + Cl_2 \rightarrow MCl_2 + SO_2 + O_2$$

of the arsenates (and their heat decomposition);

$$2FeAsO_4 + 3Cl_2 \rightarrow Fe_2O_3 + 2AsCl_3 + \tfrac{5}{2} O_2$$

$$2FeAsO_4 \rightarrow Fe_2O_3 + As_2O_3 + O_2$$

All these reactions are favored by the low $O_2$ content of the gases. Almost all these reactions supply $O_2$ and allow to reduce the quantity of air fed through 2e.

The purified ashes D flow out of the reactor II through 2d and are available for the subsequent treatments, i.e. heat recovery, magnetizing reduction, reduction to iron sponge, etc.

The hot gases G, coming from I, after having passed through cyclone III, are washed in IV. The metal chlorides and the As compounds are quantitatively precipitated. Operating according to this invention the $SO_2/Cl_2$ ratio in gases G is so high as to ensure the quantitative precipitation in IV also the $Cl_2$ according to the reaction:

$$Cl_2 + SO_2 + 2H_2O \rightarrow 2HCl + H_2SO_4$$

After washing, the gases H contain thus only $SO_2$ (13–15% b.v.), $O_2$ (3–5% b.v.), $N_2$ and $H_2O$, and they are thus suited for the production of $H_2SO$, for instance introducing them into the circuit of the roasting plant, either upstream or downstream of the water washing of the sulfurous gases, depending upon whether they contain acid fogs or not.

Thanks to the operational procedures of this invention, solution K contains Fe and As ions (and in part Cu ions) in a reduced form. Moreover, it contains a free acidity lower than that one would get from a conventional or standard chlorinating volatilization plant. This is due to the fact that the free $Cl_2$ contained in gas G is lower when one operates with this invention, given that it tends to react with the pyrite in the upper regions of the furnace into which the pyrite is fed. The solution K consequently shows a content in $FeCl_2$ greater and a content in HCl and $H_2SO_4$ lower than that one would get when operating in the absence of $FeS_2$. These three facts (lesser acidity, absence of $Fe^{+++}$ and a moderate presence of $Cu^{++}$) involve considerable savings in reactants (limestone for neutralization, scrap iron for cementation, etc.) in the subsequent hydrometallurgical stages for the recovery of the valuable metals from the solution.

The basic advantages that are achieved by operating according to this invention may be summarized as follows:

Elimination of the pre-heating phase and of the magnetizing reduction of the ashes upstream of the purification stage. The heat necessary for maintaining the temperature of the chlorination reactors at the desired value is supplied by the pyrite, preferably the same that supplies the ashes from the roasting phase;

Integral exploitation of the S initially present in the pyrite with recovery of the $SO_2$ both in the roasting process as well as in the chlorination and oxidation processes;

Obtainment of ashes free, besides of non-ferrous metals, of arsenic and sulfur. This enables one to make direct use of the ashes, for instance for the production of iron sponge or for low temperature pelletizing;

High yields in the purification of non ferrous metals with a limited consumption of $Cl_2$, since no hydrogen contianing fuels are used which, while forming water, cause the hydrolysis of the metal chlorides, with a consequential drop in yield; and A saving in the raw materials necessary for recovering the precious metals from the solutions containing the chlorides. These solutions have, in fact, a low acidity and contain cations at the lowest degree of valence.

In order to more clearly illustrate this invention a number of examples will be given in the following. The indicated percentages, where not otherwise stated, are to be understood as percentages by weight. It should be noted that N when used in $Nm.^3$ represents expressed under normal conditions, i.e. 760 mm. Hg and 0° C.

EXAMPLE 1

From a fluid bed roasting plant, 1000 kg./hr. of Spanish pyrite ashes were discharged, at an average temperature of 800° C. The ashes showed the following chemical composition (given in percent by weight):

| | |
|---|---|
| Total Fe | 60.15 |
| $Fe^{++}$ | 5.45 |
| Total S | 1.17 |
| As | 0.32 |
| Cu | 0.91 |
| Zn | 2.47 |
| Pb | 0.98 |
| BaO | 0.32 |
| CaO | 0.16 |
| MgO | 0.09 |
| $Al_2O_3$ | 0.58 |
| $SiO_2$ | 4.25 |

These ashes A were fed into a fluid reactor I, in which were simultaneously introduced 73 kg./hr. of Spanish pyrite B of the following composition:

| | |
|---|---|
| Fe | 42.36 |
| S | 48.51 |
| As | 0.43 |
| Cu | 0.77 |
| Zn | 1.82 |
| Pb | 1.04 |
| BaO | 0.22 |
| CaO | 0.12 |
| MgO | 0.07 |
| $Al_2O_3$ | 0.41 |
| $SiO_2$ | 3.05 |

Through the bottom of the reactor were then introduced 274 $Nm.^3$/hr. of air E and the gas coming from reactor II. The operational conditions were:

Temperature: 900° C.,
Dwell time in the fluid bed: 60 min.,
$O_2$ in the outflowing gases G: 3.3–3.5% by volume.

The fine powders C were retained by cyclones, and together with those of the fluid bed, were then fed into reactor II for chlorination. This feed mixture showed the following composition:

| | |
|---|---|
| Total Fe | 64.08 |
| Total S | 0.100 |
| S, in the form of monosulfide | Traces |
| As | 0.140 |
| Cu | 0.030 |
| Zn | 0.090 |
| Pb | 0.030 |

Into the same reactor were then introduced 78 kg./hr. of the same pyrite B used in the first stage, and through the bottom, were introduced 145 $Nm.^3$/hr. of air and 50 kg./hr. of $Cl_2$, corresponding to about 110% of the stoichiometric in order to eliminate as chlorides the total quantity of Cu, Zn and Pb introduced into the reactor with the ashes and pyrites. Under steady state, the operational conditions were as follows:

Temperature: 950° C.;
Dwell time in the fluid bed: about 60 min.;
$O_2$ in the reacted gases: 0.5–0.8% by volume.

The discharged ashes D had the following composition:

| | |
|---|---|
| Total Fe | 64.92 |
| Total S | 0.025 |
| Monosulfides S | Traces |
| As | 0.025 |
| Cu | 0.008 |
| Zn | 0.015 |
| Pb | 0.015 |

Gas G, flowing out of reactor I, after dedusting, was washed with an aqueous solution. Under steady state conditions there were then drawn from the circuit 500 lt./hr. of solution K, which showed the following composition (in g./lt.):

| | |
|---|---|
| Total Fe | 4.0 |
| $Fe^{++}$ | 4.0 |
| Total As | 7.2 |
| $As^{+++}$ | 7.2 |
| Total Cu | 20.3 |
| $Cu^+$ | 8.2 |
| Zn | 54.4 |
| Pb | 0.7 |

The loss in iron by volatilization as $FeCl_2$ was 0.3%, while the corresponding consumption of $Cl_2$ equals 2.54 kh./hr.

Gas H, coming out of the washing phase, shows a mean composition in percent by volume of:

| | |
|---|---|
| $N_2$ | 82.7 |
| $O_2$ | 3.0 |
| $SO_2$ | 14.3 |

EXAMPLE 2

From a fluid bed roasting plant were discharged at a temperature of 800° C., 1000 kg./hr. of Spanish pyrite ashes A, while was fed to a fluid bed reactor together with 120 kg./hr. of pyrites. Ashes and pyrite have same composition as that in Example 1.

At the bottom of the reactor were introduced 300 Nm.³/hr. of air and 51 kg./hr. of $Cl_2$, corresponding to 115% of the stoichiometric quantity required for the formation of the Cu, Zn, and Pb chlorides. The operational conditions at steady state were:

Temperature: 950° C.,
Dwell or residual time in the fluid bed: 90 minutes,
$O_2$ in the reacted gases G: 0.5–0.8% by volume.

The discharged ashes had the following composition:

| | |
|---|---|
| Total Fe | 64.78 |
| Total S | 0.030 |
| Monosulfide S | Traces |
| As | 0.030 |
| Cu | 0.010 |
| Zn | 0.040 |
| Pb | 0.030 |

From the precipitation circuit were drawn 500 lt./hr. of solution K showing the following composition in g./lt.:

| | |
|---|---|
| Total Fe | 11.7 |
| $Fe^{++}$ | 11.5 |
| Total As | 6.7 |
| $As^{+++}$ | 6.7 |
| Total Cu | 19.8 |
| $Cu^+$ | 10.1 |
| Zn | 53.0 |
| Pb | 0.8 |

The loss in iron by volatilization as $FeCl_2$, amounted to 0.8%, while the corresponding consumption of $Cl_2$ was about 6.5 kg./hr. Gas H coming out of the washing phase, showed a mean composition, expressed in percent by volume, of:

| | |
|---|---|
| $N_2$ | 83.2 |
| $O_2$ | 0.6 |
| $SO_2$ | 16.2 |

We claim:
1. A process for purifying pyrite or pyrrhotite ashes by removal therefrom non-ferrous metals, arsenic and sulfur, which comprises admixing pyrite with pyrite ashes coming from a roasting furnace at 500°–800° C. (said pyrite being in quantities of from 25–200 kg. of $FeS_2$ per ton of ash, depending on the temperature of the ashes, and treating the pyrite ash/pyrite admixture in a fluid bed at 850°–950° C. with a mixture of chlorine and oxygen containing gases in which the chlorine is equal to 105–120% of the stoichiometric with respect to the nonferrous metals and to the arsenic present in the ashes and in the admixed pyrite, and oxygen occurring in such a quantity that the outflowing gases contain from 0.5 to 5% by volume $O_2$.

2. The process of claim 1, wherein one operates in two stages, into the first of said stages are fed ashes, pyrite, air and the gases of the second stage, while into the second stage are fed the ash of the first stage, pyrite, chlorine and oxygen containing gases, the total quantities of pyrite, oxygen and chlorine containing gases being equal to the quantities indicated in claim 1.

3. The process of claim 2, wherein the oxygen containing gas is air.

4. The process of claim 3, wherein the oxygen in the outflowing gases is quantitatively less than 1% by volume.

5. The process of claim 1, wherein one operates in one single stage.

6. The process of claim 5, wherein the oxygen containing gas is air.

7. The process of claim 6, wherein the oxygen in the outflowing gases is quantitatively less than 1% by volume.

References Cited

UNITED STATES PATENTS

| 3,479,177 | 11/1969 | Veronica | 75—9 |
| 3,649,245 | 3/1972 | Colombo | 75—9 |
| 3,684,492 | 8/1972 | Colombo | 75—117 |

CHARLES N. LOVELL, Primary Examiner

P. D. ROSENBERG, Assistant Examiner

U.S. Cl. X.R.

75—1, 6, 9, 26